Patented June 15, 1943

2,321,766

UNITED STATES PATENT OFFICE 2,321,766

PHENOL ALDEHYDE RESIN

Frederick M. Murdock, Chicopee Falls, Mass., assignor to Monsanto Chemical Company, St. Louis, Mo., a corporation of Delaware No Drawing. Application February 1, 1940, Serial No. 316,764

19 Claims. (Cl. 260—34)

This invention relates to improvements in the method of making phenol aldehyde resins and the product obtained thereby. It is particularly pertinent to transparent resins of the casting type produced by the reaction of formaldehyde or formaldehyde producing substances on a phenol.

Cast phenol formaldehyde resinous products have been made for many years by the process of pouring the liquid resin into suitable molds and then hardening the resin by raising the temperature of the molds for varying periods of time, with or without the application of pressure. Many of the processes described for the preparation of casting resins have been directed to producing transparent products. It is understandable that transparency should be desired so that a more versatile product is available to the manufacturer, since he can then not only use the same basic formulation for transparent articles, but by the addition of suitable pigments or fillers can produce translucent or opaque products.

Considerable improvement has been made in the physical properties of phenol formaldehyde resins of the casting type during recent years. This has been reflected in an increased use of this material for various purposes particularly where its decorative brilliance and permanence is a factor. Despite any progress that may have been made, I have noted defects that may be inherent in all cast phenolic resins and may be perceptible only in transparent resins. Here, even a casual examination frequently shows the undesirability of the product. Thus, for example, small fissures may be perceptible within the castings. These fissures may be the result of some sort of strain and serve not only to weaken the casting but to detract from its appearance by reflecting light rays. Occasionally, the crude castings have a surface haze that must be removed before the transparency of the material is fully revealed and occasionally castings are hazy throughout.

It is, therefore, desirable to improve the methods of manufacturing cast phenolic resins as heretofore employed and the product obtained thereby.

According to the present invention, I have found that these defects can be substantially prevented and at the same time the processing of transparent resin from phenol and formaldehyde greatly facilitated. This has been accomplished by the neutralization of the alkaline condensing agent by means of certain esters that are capable of hydrolysis under the conditions existing in the reaction mix.

These esters are found to impart a number of valuable and useful properties to the resin. For example, exceptional clarity is imparted to the cured resin even when cast at low viscosities. In addition to clarity the resins are distinguished by freedom from fissures of the type discussed above and from surface haze, even when cast into lead molds.

Thus, I have found that, to be effective for this purpose, the esters must have a sufficiently high rate of hydrolysis as measured by the test hereinafter described. Moreover, it is generally preferred that the acidic hydrolysis product be of low volatility. I have found it convenient to measure the rate of hydrolysis by boiling, under reflux conditions in a suitable glass apparatus, a mixture of the ester and water in the ratio of 0.100 gram molecule of the ester to 500 cc. of water for 6 hours. The per cent hydrolysis is then determined by titrating the amount of free acid present with 0.1N KOH solution, using phenolphthalein as the indicator of the end point.

According to this invention, it has been found that esters hydrolyzing at least to the extent of 0.28%, under the conditions of the previously described test, are suitable for the purpose of neutralizing the alkaline condensing agent of the resin.

Examples of such esters whose hydrolysis rates equal or exceed this minimum rate are:

| | Per cent hydrolysis |
|---|---|
| Methyl phthalyl ethyl glycollate | 0.33 |
| Ethyl phthalyl ethyl glycollate | 0.41 |
| Benzyl Cellosolve acetate | 4.08 |
| Glycerin tri-propionate | 0.60 |
| Di-ethyl succinate | 1.60 |
| Benzyl methyl phthalate | 0.38 |
| β-Methoxy ethyl phthalyl ethyl glycollate | 0.37 |
| Methyl phthalyl β-methoxy ethyl glycollate | 0.66 |
| Butyl maleyl ethyl glycollate | 0.28 |
| Methyl maleyl ethyl glycollate | 32.8 |
| Butyl maleyl butyl glycollate | 0.56 |
| Di-butyl di-glycollate | 4.9 |
| Di-amyl thio-di-glycollate | 1.2 |
| Di-butyl oxalate | 15.9 |
| Di-butyl tartrate | 3.7 |
| Tri-β-chlorethyl phosphate | 1.5 |
| Tri-ethyl citrate | 0.30 |
| Tri-n-propyl citrate | 0.73 |
| Di-butyl itaconate | 0.77 |
| Tri-ethyl phosphate | 9.85 |

| | Per cent hydrolysis |
|---|---|
| Methyl di-phenyl phosphate | 10.4 |
| Di-butyl maleate | 1.85 |
| Di-glyceryl tetraacetate | 20.3 |
| Di-tetrahydrofurfuryl phthalate | 5.2 |

Examples of esters where hydrolysis rates lie below the minimum rate, and therefore are outside of the scope of this invention are:

| | Per cent hydrolysis |
|---|---|
| Tri-n-butyl phosphate | 0.06 |
| Butyl laurate | 0.20 |
| Amyl benzoate | 0.05 |
| Di-n-butyl phthalate | 0.04 |
| Di-methoxy ethyl phthalate | 0.10 |
| Di-methyl phthalate | 0.07 |
| Di-ethyl phthalate | 0.03 |
| Methyl methoxy-ethyl phthalate | 0.17 |
| Butyl phthalyl butyl glycollate | 0.02 |
| Di-butyl sebacate | 0.03 |
| Tri-cresyl phosphate | 0.01 |
| Acetyl tri-butyl citrate | 0.05 |

The following are given as specific embodiments of this invention, but are not to be understood as limitative of the scope thereof.

*Example 1*

The following ingredients are reacted at 80° C., for 3 hours, in a suitable glass flask or reaction kettle, preferably in the absence of oxygen to prevent discoloration, and the mix is then partially dehydrated by boiling under reduced pressure at a temperature of substantially 45° C. The quantities herein employed are in the ratio of substantially three molecules of formaldehyde to one molecule of phenol.

| | Parts by weight |
|---|---|
| Phenol | 100 |
| Formaldehyde solution (37%) | 258 |
| Sodium carbonate | 3 |

To the partially dehydrated resin are added 20 parts by weight of methyl phthalyl ethyl glycollate and the boiling, under reduced pressure, is continued. During this stage, the temperature of the resin is raised to 80° C. to increase the rate of dehydration and to maintain the viscosity of the resin in a workable range. After the dehydration is substantially complete, as measured by viscosity or other means, the resin is poured into suitable molds and hardened by curing at a temperature of 85° C.

The hardened resin is clear and free from defects, and possesses a pale yellow tint that can be neutralized by the addition of suitable dyes before the resin is poured, and, preferably, after addition of the ester.

*Example 2*

The same ingredients are reacted and the process employed is the same as in Example 1, with the exceptions that the reaction time is 2 hours at 80° C. instead of 3 hours and the methyl phthalyl ethyl glycollate is added at the start of the dehydration. The hardened product is similar in appearance to that from Example 1.

*Example 3*

This example is similar to Example 1, with the exceptions that 40 parts by weight of methyl phthalyl ethyl glycollate is employed and the ester is added at the start of the dehydration. The dehydrated resin hardens more slowly than that made under Example 1, but is more flexible and is more easily worked.

*Example 4*

In this example, 20 parts by weight of glycerin and 4 parts by weight of acetic acid are added to the liquid resin, processed as in Example 1, after the addition of the methyl phthalyl ethyl glycollate. Final dehydration and hardening are conducted as usual and a product of exceptional color, clarity and working properties is obtained.

*Example 5*

The following ingredients are reacted as in Example 1.

| | Parts by weight |
|---|---|
| Phenol | 100 |
| Formaldehyde solution (37%) | 215 |
| Sodium carbonate | 3 |

In this example, the molecular ratio of formaldehyde to phenol is reduced to 2.5:1 from the 3:1 ratio used in the previous examples. The above ingredients are reacted for 2 hours at 80° C., 40 parts of methyl phthalyl ethyl glycollate added, the resin dehydrated and hardened in the usual manner.

The hardened resin has good clarity and freedom from defects.

*Example 6*

In this example, ethyl phthalyl ethyl glycollate is substituted for methyl phthalyl ethyl glycollate as employed in Example 1 and a product obtained similar to that in Example 1.

*Example 7*

In this example, butyl maleyl ethyl glycollate, methyl maleyl ethyl glycollate, butyl succinyl butyl glycollate and ethyl succinyl ethyl glycollate are substituted for methyl phthalyl ethyl glycollate as employed in Example 1, and a light colored product obtained, indicating that the alkaline condensing agent has been neutralized.

*Example 8*

In this example, methyl phthalyl β-methoxyethyl glycollate, methyl lactate and methyl phthalyl methyl glycollate are substituted for methyl phthalyl ethyl glycollate as employed in Example 1, but without further dehydration previous to heat hardening, and produce light colored products indicative of neutralization of the alkaline condensing agent.

The following are given as specific examples of the use of esters that are outside the scope of this invention.

*Example 9*

Butyl phthalyl butyl glycollate is substituted for methyl phthalyl ethyl glycollate as employed in Example 1. The product so obtained is turbid and deep red in color (indicating alkalinity of the resin), and is not easily worked. After a short period of aging, large cracks generally appear in the casting similar to those which appear in the absence of any additions to the alkaline reaction product.

*Example 10*

Di-methyl phthalate is substituted for methyl phthalyl ethyl glycollate as employed in Example 1, but without further dehydration previous to heat hardening. The product is clear, deep red (indicating alkalinity of the resin), and is not easily worked. After a short period of aging, large cracks generally appear in the casting similar to those which appear in the absence of any additions to the alkaline reaction product.

In the operation of the present invention, the amount of ester added should be at least sufficient to neutralize the basic condensing agent. However, an excess of ester over that theoretically required to neutralize the alkaline condensing agent has been found helpful in some instances. This additional amount of ester has, in such cases, the advantage of rendering the hardened resin more easily worked. Thus, as has been shown hereintofore, 20–40 parts by weight of methyl phthalyl ethyl glycollate is a desirable amount to use when the alkaline condensing agent is present in an amount equivalent to 3 parts of sodium carbonate. If a larger amount of alkali is used, a larger amount of the ester is generally desirable.

It is, of course, understood that other basic substances may be substituted for sodium carbonate, including organic bases. Again, the amount of basic condensing agent may be varied to a considerable degree provided the amount of ester be at least sufficient to neutralize all the basic condensing agent.

Variations other than these already indicated may be introduced into the process without departing either from the scope of the invention or the results obtained thereby. An increase in either the reaction temperature or duration of the reaction increases the extent of the initial reaction. The extent of this reaction may be varied substantially in this process, but care must be taken to avoid difficulties inherent either in an extremely long or extremely short reaction, as is well known to those skilled in the art.

The viscosity at which the resin is cast is also subject to wide variation. For ease of pouring, a high viscosity is usually avoided. This can be done without producing hazy castings or castings containing fissures, surface haze or other defects. The hardening process is carried out as usual in this art. A curing temperature in the range of 70–90° C. is usually convenient and results in a hardening rate that is not unduly long.

What is claimed:

1. In the process of manufacturing resins of the casting type the step comprising completely neutralizing the alkaline reaction product of phenol and formaldehyde by the addition thereto of methyl phthalyl ethyl glycollate.

2. In the process of manufacturing resins of the casting type the step comprising completely neutralizing the alkaline reaction product of phenol and formaldehyde by the addition thereto of ethyl phthalyl ethyl glycollate.

3. In the process of manufacturing resins of the casting type the step comprising completely neutralizing the alkaline reaction product of phenol and formaldehyde by the addition thereto of methyl phthalyl methyl glycollate.

4. In the process of manufacturing resins of the casting type the steps in combination comprising completely neutralizing the alkaline reaction product of phenol and formaldehyde with methyl phthalyl ethyl glycollate, and the addition thereto of glycerine and a relatively small proportion of acetic acid.

5. A cast phenol formaldehyde resin, comprising the alkaline reaction product of phenol and formaldehyde completely neutralized by the addition of an ester of a polybasic organic carboxylic acid to the alkaline reaction product, said ester hydrolyzing at least to the extent of 0.28%, when a mixture of 0.1 gram molecule of the ester and 500 cc. of water is boiled under reflux conditions for 6 hours.

6. A cast phenol formaldehyde resin, comprising the alkaline reaction product of phenol and formaldehyde completely neutralized by the addition of an ester of phthalyl glycollic acid and a monohydric alcohol of not more than three carbon atoms to the alkaline reaction product, said ester hydrolyzing at least to the extent of 0.28%, when a mixture of 0.1 gram molecule of the ester and 500 cc. of water is boiled under reflux conditions for 6 hours.

7. A cast phenol formaldehyde resin, comprising the alkaline reaction product of phenol and formaldehyde completely neutralized by the addition of methyl phthalyl ethyl glycollate to the alkaline reaction product.

8. A cast phenol formaldehyde resin, comprising the alkaline reaction product of phenol and formaldehyde completely neutralized by the addition of ethyl phthalyl ethyl glycollate to the alkaline reaction product.

9. A cast phenol formaldehyde resin, comprising the alkaline reaction product of phenol and formaldehyde completely neutralized by the addition of methyl phthalyl methyl glycollate to the alkaline reaction product.

10. A cast phenol formaldehyde resin, comprising the alkaline reaction product of phenol and formaldehyde completely neutralized by the addition of methyl phthalyl ethyl glycollate to the alkaline reaction product, to which glycerine and a relatively small proportion of acetic acid are then added.

11. In the process of manufacturing resins of the casting type the step comprising completely neutralizing the alkaline reaction product of a phenol and formaldehyde by the addition thereto of an organic carboxylic acid ester, said ester hydrolyzing at least to the extent of 0.28%, when a mixture of 0.1 gram molecule of the ester and 500 cc. of water is boiled under reflux conditions for 6 hours.

12. In the process of manufacturing resins of the casting type the step comprising completely neutralizing the alkaline reaction product of phenol and formaldehyde by the addition thereto of an ester of a polybasic organic carboxylic acid, said ester hydrolyzing at least to the extent of 0.28% when a mixture of 0.1 gram molecule of the ester and 500 c. c. of water is boiled under reflux conditions for 6 hours.

13. In the process of manufacturing resins of the casting type the step comprising completely neutralizing the alkaline reaction product of phenol and formaldehyde by the addition thereto of an ester of phthalyl glycollic acid, said ester hydrolyzing at least to the extent of 0.28%, when a mixture of 0.1 gram molecule of the ester and 500 cc. of water is boiled under reflux conditions for 6 hours.

14. In the process of manufacturing resins of the casting type the step comprising completely neutralizing the alkaline reaction product of phenol and formaldehyde by the addition thereto of an ester of phthalyl glycollic acid and a monohydric alcohol of not more than 3 carbon atoms, said ester hydrolyzing at least to the extent of 0.28% when a mixture of 0.1 gram molecule of the ester and 500 c. c. of water is boiled under reflux conditions for 6 hours.

15. A cast phenol formaldehyde resin, comprising the alkaline reaction product of a phenol and formaldehyde completely neutralized by the addition thereto of an organic carboxylic acid ester, said ester hydrolyzing at least to the extent of 0.28%, when a mixture of 0.1 gram molecule of the ester and 500 cc. of water is boiled under reflux conditions for 6 hours.

16. A cast phenol formaldehyde resin, comprising the alkaline reaction product of phenol and formaldehyde completely neutralized by the addition thereto of an organic carboxylic acid ester, said ester hydrolyzing at least to the extent of 0.28%, when a mixture of 0.1 gram molecule of the ester and 500 c. c. of water is boiled under reflux conditions for 6 hours.

17. A cast phenol formaldehyde resin, comprising the alkaline reaction product of phenol and formaldehyde completely neutralized by the addition thereto of an alkyl ester of a polybasic organic carboxylic acid, said ester hydrolyzing at least to the extent of 0.28%, when a mixture of 0.1 gram molecule of the ester and 500 cc. of water is boiled under reflux condition for 6 hours.

18. A cast phenol formaldehyde resin, comprising the alkaline reaction product of phenol and formaldehyde completely neutralized by the addition thereto of an ester of phthalyl glycollic acid, said ester hydrolyzing at least to the extent of 0.28%, when a mixture of 0.1 gram molecule of the ester and 500 cc. of water is boiled under reflux conditions for 6 hours.

19. A cast phenol formaldehyde resin comprising the alkaline reaction product of phenol and formaldehyde completely neutralized by the addition thereto of an alkyl ester of phthalyl glycollic acid, said ester hydrolyzing at least to the extent of 0.28%, when a mixture of 0.1 gram molecule of the ester and 500 cc. of water is boiled under reflux conditions for 6 hours.

FREDERICK M. MURDOCK.